United States Patent [19]

Caprasse

[11] Patent Number: 4,884,273
[45] Date of Patent: Nov. 28, 1989

[54] METHOD AND APPARATUS FOR MONITORING THE CONSISTENCY OF SUCCESSIVE BINARY CODE SIGNAL GROUPS IN DATA PROCESSING EQUIPMENT

[75] Inventor: Friedhelm Caprasse, Zorneding, Fed. Rep. of Germany

[73] Assignee: Siemens Aktiengesellschaft, Berlin and Munich, Fed. Rep. of Germany

[21] Appl. No.: 147,723

[22] Filed: Jan. 25, 1988

[30] Foreign Application Priority Data

Feb. 3, 1987 [DE] Fed. Rep. of Germany ....... 3703184

[51] Int. Cl.⁴ .............................................. G06F 11/10
[52] U.S. Cl. .................................................... 371/49.4
[58] Field of Search ...................................... 371/49, 51

[56] References Cited

U.S. PATENT DOCUMENTS

| | | | |
|---|---|---|---|
| 3,111,578 | 11/1963 | Gerrand et al. | 371/49 |
| 3,404,372 | 10/1968 | Robbins | 371/49 |
| 3,567,916 | 3/1971 | Fullton, Jr. | 371/49 |
| 3,699,322 | 10/1972 | Dorr | 371/49 |
| 3,805,040 | 4/1974 | Boden et al. | 371/49 |
| 3,891,969 | 6/1975 | Christensen | 371/37 |
| 3,911,261 | 10/1975 | Taylor | 371/49 |
| 4,074,229 | 2/1978 | Prey | 371/60 |
| 4,107,649 | 8/1978 | Kurihara | 371/49 |
| 4,291,407 | 9/1981 | Armstrong | 371/49 |
| 4,556,978 | 12/1985 | Kregness et al. | 371/49 |
| 4,727,548 | 2/1988 | Dickey | 371/49 |

OTHER PUBLICATIONS

"The TTL Data Book For Design Engineers", Texas Instrument, 1977, pp. 7-269, 7-270.

*Primary Examiner*—Charles E. Atkinson
*Attorney, Agent, or Firm*—Hill, Van Santen, Steadman & Simpson

[57] ABSTRACT

For monitoring the consistency of successive binary code signal groups (CG) in data processing systems by parity bit comparison of the parity bit (PAKT) currently calculated for an effective code signal group (CG) to the parity bit (PAKT') predictively calculated at the appearance of the predecessor code signal group, and intermediately stored until the appearance of the effective code signal group (CG), the respectively predictive parity bit is calculated from the effective code signal group (CG) with an indicator signal (PW) indicating change of parity bit is generated upon transition to the successor code signal group and, subsequently, the predictive parity bit (PV) belonging to the successor code signal group is formed in conjunction with the current parity bit (PAKT) calculated for the effective code.

4 Claims, 1 Drawing Sheet

METHOD AND APPARATUS FOR MONITORING THE CONSISTENCY OF SUCCESSIVE BINARY CODE SIGNAL GROUPS IN DATA PROCESSING EQUIPMENT

BACKGROUND OF THE INVENTION

The invention is directed to a method and to an arrangement for monitoring the consistence of successive binary code signal groups in data processing equipment, where a predictive calculation of parity bit is made in response to a preceding code signal group.

U.S. Pat. No. 4,074,229 discloses such a method, particularly with reference to the code signal groups employed for addressing an instruction word memory. From the established address, the predictive parity bit belonging to the successor address is identified for selecting the memory for the write-in of an instruction, and is deposited in a bit position provided in addition to the instruction. The parity bit belonging to the successor address is therefore always available with the readout of an instruction. This parity bit is then intermediately stored and, when the instruction memory is selected by the successor address, it is compared to the parity bit directly derived from this successor address. An error signal is generated when there is inequality of comparison.

Even when storing only the predictive parity bit instead of the entire instruction word, this method requires a memory comprising a plurality of memory locations corresponding in number to the totality of memory addresses. The hardware outlay required for such a memory is very high and depends on the number of code signal groups.

SUMMARY OF THE INVENTION

It is, therefore, a principal object of the invention to provide a method and an arrangement for monitoring the consistence of successive binary code signal groups without requiring gate-intensive memories.

This object is achieved by the present invention by deriving an indicator signal PWi for a change in the parity, employing a different relationship for successive code groups in ascending and descending order, and using the indicator signal in the predictive calculation of parity bits. It is crucial that the predicting identification of the parity bit does not take place in advance, with the results for all code signal groups being stored in a gate-intensive memory, but that the parity bit for the successor code signal group, proceeding from the effective code signal group, is respectively identified only by deriving an intermediate signal in combination with the current parity bit belonging to the effective code signal group. The intermediate signal specifies whether the current parity bit of the effective code signal group will change upon transition to the successor code signal group or not. It can be formed in a simple way from the bit positions of the effective code signal group by means of an appropriate operation. Together with the current parity bit identified for the effective code signal group, the parity bit belonging to the successor code signal group can then be predicted.

In order to prevent an error signal from being mistakenly generated at the beginning of a new sequence of code signal groups or, respectively, given skips within such sequences due to the initially lacking, predictively identified parity bit, an improvement of the invention provides that the parity bit normally carried along with the respectively first code signal group is intermediately stored as a predictively identified parity bit.

On the other hand, mistakenly generated error signals can be generally suppressed, according to another development of the invention, in that the comparison between the current parity bit and the predictively identified parity bit is controlled by a validity signal.

BRIEF SUMMARY OF THE DRAWINGS

Let details of the invention be set forth in greater detail below with reference to an exemplary embodiment shown in the drawings, in which.

DESCRIPTION OF THE PREFERRED EMBODIMENTS

Figure 1:
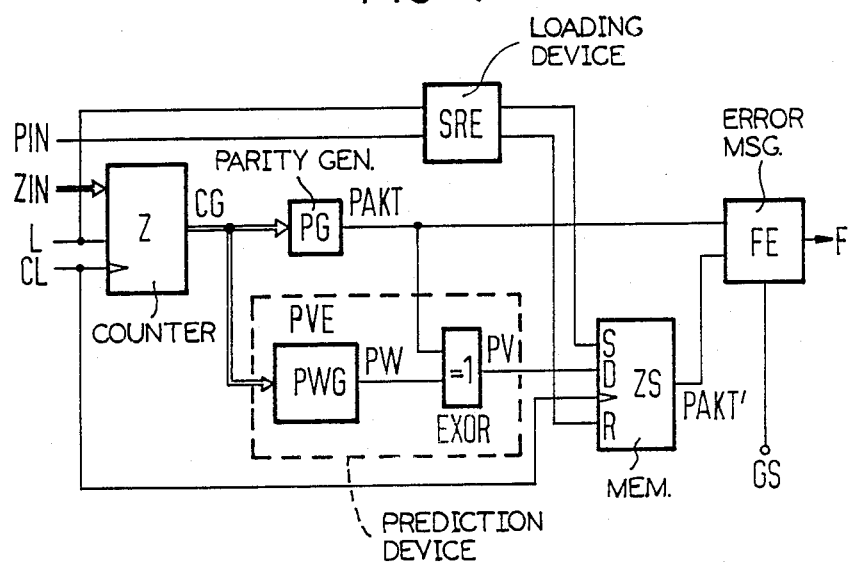
FIG. 1 is a block circuit diagram of apparatus for monitoring the consistency of successive code signal groups in accord with the invention.

The circuit arrangement for monitoring the consistency of successive code signal groups CG, shown in FIG. 1, has a counter Z that is incremented step-by-step by a clock signal CL and, thus, supplies a sequence of binary code signal groups CG. Via a data input ZIN, the counter Z can be loaded with a defined initial counter reading at the beginning of a sequence of code signal groups, this being controlled with the loading signal L. The code signal groups CG produced at the counter output are simultaneously supplied to a parity bit generator PG and to a parity bit prediction device PVE. The parity bit generator PG, which, for example, can be constructed as recited in 'The TTL Data Book For Design Engineers', Texas Instruments, 1977, p. 7–270, identifies a current parity bit PAKT from the effective code signal group CG. The current parity bit PAKT is forwarded to an error message device FE and to the parity bit prediction device PVE. The parity bit prediction device PVE calculates a predictive parity bit PV belonging to the successor code signal group from the effective code signal group CG and from the current parity bit PAKT. Proceeding on the basis of the effective code signal group CG, the indicator generator PWG, generates an indicator signal PW to indicate a change of parity bit. The indicator signal PW for a change of parity bit indicates whether the parity of the effective code signal group CG will change upon transition to the successor code signal group. When the indicator signal PW for a change of parity bit assumes the logical value 1, the parity changes. By exclusive-OR operation of the current parity bit PAKT with the indicator signal PW for change of parity bit, the predictive parity bit PV for the successor code signal group is then calculated.

The predictive parity bit PV is forwarded to the data input D of an intermediate memory ZS that, for example, can be a D-flip-flop with setting input S and resetting input R. The intermediate memory ZS stores the predictively calculated parity bit PV until the code signal group appertaining thereto takes effect. The output of the memory ZS is then provided with the same clock signal CL with which the counter Z is incremented. With the appearance of a clock pulse CL, the predictively calculated parity bit PV is stored in the intermediate memory and is output as a current parity bit PAKT' at the output of the intermediate memory.

The parity bit PAKT' output by the intermediate memory AS is forwarded to the error message device FE that is composed of a comparator with a following AND gate connected to its output. This error message device FE compares the parity bit PAKT' generated by the parity bit generator PG to the parity bit PAKT output by the intermediate memory ZS. An error signal F is generated in case of error, i.e. when the two parity bits do not agree. Expediently, the output of the error signal is controlled via a validity signal GS that is conducted to the AND gate in order to suppress an error signal F arising due to not exactly simultaneous presence of the two parity bits PAKT and PAKT'.

For starting a code signal group sequence, the co-supplied parity bit PIN belonging to the first effective code signal group is transferred via the loading device SRE to the intermediate memory ZS in which an appropriate set or reset signal for the immediate activation of this parity bit is formed, in response to the loading signal L. The loading device SRE, for example, comprises two AND gates each having two inputs for the parity bit signal PIN and for the loading signal L, with an inverter in the path of that input supplied with the parity bit signal PIN to that AND gate whose output supplies the reset signal for the intermediate memory ZS. Despite the predictive parity bit PV not being present per se, on initiation, an error monitoring can thus be carried out in the same way even in the first code signal group of a sequence. This, however, can be omitted when an erroneously formed error signal is suppressed by an appropriate control of the validity signal GS for the error message means FE.

Figure 2:
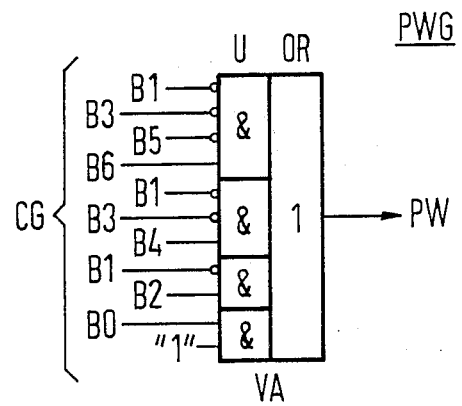
FIG. 2 is a logic arrangement for deriving the indicator signal of a parity bit change in the parity bit predictor apparatus of FIG. 1.

FIG. 2 shows the logic arrangement VA of the indicator generator PWG. It calculates an indicator signal PW for change of parity bit dependent on the code signal group CG applied to the input side. The code signal group CG is thereby assumed to have eight bit positions B0 through B7. In this case, only the bit position signals B0 through B6 are required for the identification of the indicator signal for change of parity bit. These traverse two gate levels in the logic arrangement VA. The first gate level U comprises four AND gates, each with an ascending plurality of inputs each of which supplies a signal when a specific combination of bit position signals appears at its input. In the second gate level OR, the individual AND gate outputs are interconnected by an OR operation to form a single output signal PW. Overall, the logic arrangement VA simulates the relationship $$PW_i = 2^0 v \bigcup_{n=0}^{n=|(i-3)/2|} \left[ \left( \bigcap_{m=0}^{m=n} 2^{2m+1} \right) \cap 2^{2(n+1)} \right] \text{for } i > 2$$

for code signal groups following one another in descending order, in which:

i is the bit position number of a code signal group having the bit position signals $2^{(i-1)}, 2^{(i-2)}, \ldots 2^1, 2^0$, ∪ signifies a disjunctive or OR operation of the individual bit position signals, ∩ signifies a conjunctive or AND operation of the individual bit position signals, and

| signifies the whole-number part of i−3/2.

When code signal groups following one another in ascending order are to be monitored, the logic arrangement VA must simulate the relationship $$PW_i = 2^0 v \bigcup_{n=0}^{n=|(i-3)/2|} \left[ \left( \bigcap_{m=0}^{m=n} 2^{2m+1} \right) \cap 2^{2(n+1)} \right] \text{for } i > 2$$

The bit position signal $BO = 2^0$ can be connected to the OR gate level either directly or via an AND gate whose input is wired such that the bit position signal BO is directly through-connected.

It will be apparent that various modifications and/or additions may be made in the apparatus of the invention without departing from the essential feature of novelty involved, which are intended to be defined and secured by the appended claims.

I claim:

1. A method for monitoring the consistency of successive binary code signal groups, including binary numbers of a prescribed length used as addresses in data processing equipment, comprising the steps of
    comparing the current parity bit to the parity bit predictively calculated for the current code signal group in response to the predeccessor code signal group, and intermediately stored,
    generating an error signal in the case of inequality,
    generating an indicator signal ($PW_1$) indicating a possible change in parity bit upon transition to the successor code signal group ($CG_{x\pm 1}$) for every effective code signal group ($CG_x$) according to the relationship $$PW_i = 2^0 v \bigcup_{n=0}^{n=|(i-3)/2|} \left[ \left( \bigcap_{m=0}^{m=n} 2^{2m+1} \right) \cap 2^{2(n+1)} \right] \text{for } i > 2$$

for code signal groups ($CG_x$, $CG_{x+1}$) following one another in ascending order, and according to the relationship $$PW_i = 2^0 v \bigcup_{n=0}^{n=|(i-3)/2|} \left[ \left( \bigcap_{m=0}^{m=n} 2^{2m+1} \right) \cap 2^{2(n+1)} \right] \text{for } i > 2$$

for code signal groups ($CG_x$, $CG_{x-1}$) following one another in descending order, said indicator signal being derived from the bit position signals ($2^{n=1}, 2^2, \ldots, 2^1 2^0$) of the respectively effective code signal group ($CG_x$); and
    predictively calculating the parity bit (PV) belonging to the successor code signal group ($CG_{x\pm 1}$) from the respectively calculated indicator signal ($PW_1$) together with the current parity bit (PAKT) respectively calculated from the effective code signal group ($CG_x$), by an exclusive-OR operation.

2. The method according to claim 1, including the step of intermediately storing the parity bit (PIN) normally co-supplied with the first code signal group (ZIN) as a predictively calculated parity bit (PV) at the beginning of a new sequence of code signal groups or following skips within such sequences.

3. The method according to either of claims 1 or 2, including the step of controlling the comparision between the respectively calculated, current parity bit (PAKT) and the respective, predictively calculated and intermediately stored parity bit (PAKT') by a validity signal (GS).

4. A circuit arrangement for monitoring the consistency of successive binary code signal groups, comprising, in combination; a parity bit generator (PG) for the calculation of the current parity bit (PAKT) from the effective code signal group, a parity bit prediction means (PVE) for calculating a predictive parity bit from said code signal group, an intermediate memory (ZS) for intermediately storing said predictive parity bit, said intermediate memory having selectively presettable loading means (SRE), and an error message means (FE) connected to said parity bit generator and to said intermediate memory for indicating a noncomparison of the current parity bit and the bit stored in said memory, said parity bit prediction means (PVE) comprising an indicator generator means (PWG) for the formation of an indicator signal (PW) for change of parity bit, and a parity bit prediction logic unit (EXOR) connected to receive said indicator signal (PW) for the calculation of the predictive parity bit (PV) in combination with the current parity bit (PAKT) calculated from the respectively effective code signal group ($CG_x$), whereby the indicator means (PWG) comprises a logic arrangement (VA) that derives the logical relationship $$PW_i = 2^0_v \bigcup_{n=0}^{n=|(i-3)/2|} \left[ \left( \bigcap_{m=0}^{m=n} 2^{2m+1} \right) \cap 2^{2(n+1)} \right] \text{for } i > 2$$

for code signal groups ($CG_x$, $CG_{x-1}$) following one another in ascending order and the logical relationship $$PW_i = 2^0_v \bigcup_{n=0}^{n=|(i-3)/2|} \left[ \left( \bigcap_{m=0}^{m=n} 2^{2m+1} \right) \cap 2^{2(n+1)} \right] \text{for } i > 2$$

for code signal groups ($CG_x$, $CG_{x-1}$) following one another in descending order, from the bit position signals ($2^{i-1}, 2^1, \ldots, 2^1, 2^0$) of the respectively effective code signal group ($CG_x$).

* * * * *